J. P. JOHANSSON.
ELASTIC BALL BEARING FOR NECK JOURNALS.
APPLICATION FILED SEPT. 28, 1912.
1,064,912.
Patented June 17, 1913.
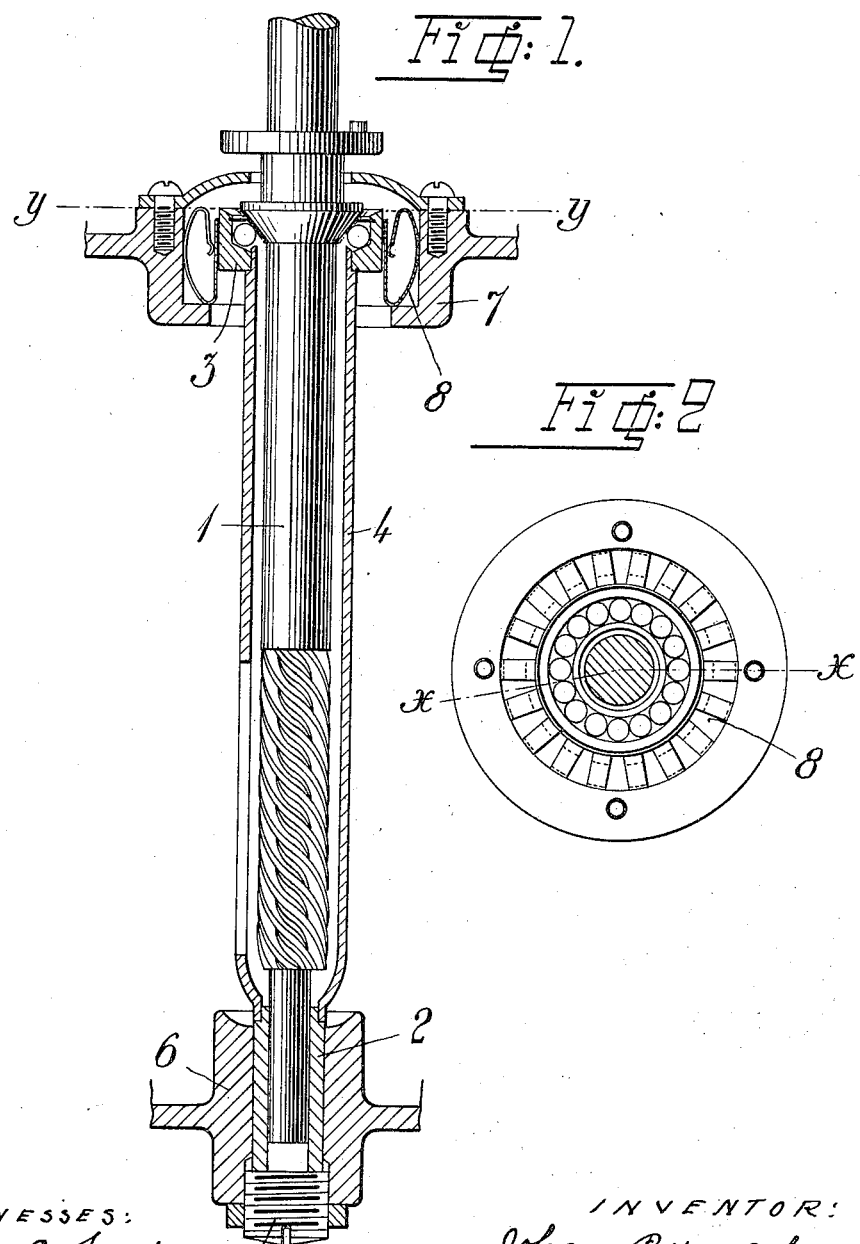

UNITED STATES PATENT OFFICE.

JOHAN PETTER JOHANSSON, OF EUKÖPING, SWEDEN.

ELASTIC BALL-BEARING FOR NECK-JOURNALS.

1,064,912.  Specification of Letters Patent.  Patented June 17, 1913.

Application filed September 28, 1912. Serial No. 722,827.

*To all whom it may concern:*

Be it known that I, JOHAN PETTER JOHANSSON, a subject of the King of Sweden, residing at Euköping, Sweden, have invented new and useful Improvements in Elastic Ball-Bearings for Neck-Journals, of which the following is a specification.

This invention relates to an improved elastic neck- and thrust bearing especially for centrifuges by means of which it will be possible to raise or to lower the bearing and the shaft completely supported thereby, by raising or lowering the guide-bushing surrounding the lower end of the said shaft.

The invention is characterized by the fact that the above mentioned elastic neck and thrust bearing is supported by a sleeve resting on the guide-bushing which in its turn is supported and adjusted by means of a screw arranged in the support of the machine.

In the accompanying drawing forming a part of this application Figure 1 is a vertical section through the elastic neck- and thrust bearing and the guide-bushing taken on line $x$—$x$, Fig. 2, and Fig. 2 is a horizontal section, taken on the broken line $y$—$y$, Fig. 1.

1 is the shaft, 2 the guide-bushing and 3 the elastic neck- and thrust bearing, which latter is supported by a sleeve 4, surrounding the shaft 1 and resting on the guide-bushing 2.

5 is an adjustable screw arranged in the fixed part of the machine by means of which screw the guide-bushing 2 and also the sleeve, the neck- and thrust bearing 3 and the shaft 1 are raised or lowered.

8 is an elastic collar surrounding the combined neck- and thrust bearing.

6 and 7 are fixed parts of the support of the machine (in the present case a centrifuge) in which the guide-bushing and the elastic neck- and thrust bearing are arranged.

When the position of the guide-bushing 2 is adjusted by means of the screw 5 the sleeve and the elastic neck-and-thrust bearing 3 and also the shaft 1 which is completely supported by the combined neck- and thrust bearing automatically are raised or lowered simultaneously. The arrangement is of a simple construction and because the screw is accessible from the outside of the support the adjusting may be carried out very easily, which of course is of a great practical value.

Having now particularly described the nature of my invention and the manner of its operation, what I claim is:

In centrifugal separators with vertical shafts, an elastic neck-and-thrust bearing supporting the whole weight of the shaft, a sleeve surrounding the shaft and supporting said neck-bearing, a guide-bushing for the lower end of the shaft supporting said sleeve, and a screw adjustable from the outside of the machine and arranged in a fixed part thereof so as to support said guide-bushing but not being in contact with the shaft.

In testimony whereof I have signed my name to this specification in the presence of two subscribing witnesses.

JOHAN PETTER JOHANSSON.

Witnesses:
H. HAMMAR,
JACOB BOGGS.

---

Copies of this patent may be obtained for five cents each, by addressing the "Commissioner of Patents, Washington, D. C."